United States Patent
Yoshizawa et al.

(10) Patent No.: US 9,906,054 B2
(45) Date of Patent: Feb. 27, 2018

(54) RELAY CONNECTOR AND BATTERY PACK

(71) Applicant: KABUSHIKI KAISHA TOYOTA JIDOSHOKKI, Kariya-shi, Aichi (JP)

(72) Inventors: Hiromasa Yoshizawa, Kariya (JP); Yusuke Tsutsui, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 116 days.

(21) Appl. No.: 14/914,687

(22) PCT Filed: Jun. 9, 2014

(86) PCT No.: PCT/JP2014/065177
§ 371 (c)(1),
(2) Date: Feb. 26, 2016

(87) PCT Pub. No.: WO2015/040900
PCT Pub. Date: Mar. 26, 2015

(65) Prior Publication Data
US 2016/0211685 A1  Jul. 21, 2016

(30) Foreign Application Priority Data

Sep. 20, 2013  (JP) .................................. 2013-194772

(51) Int. Cl.
*H02J 7/00* (2006.01)
*H01M 10/46* (2006.01)
*H01M 10/42* (2006.01)

(52) U.S. Cl.
CPC .......... *H02J 7/0031* (2013.01); *H01M 10/425* (2013.01); *H01M 10/4257* (2013.01);
(Continued)

(58) Field of Classification Search
CPC .......... H02J 7/0031; H02H 2007/0039; H01M 10/425; H01M 10/46; H01M 2200/00
(Continued)

(56) References Cited

U.S. PATENT DOCUMENTS 5,610,496 A      3/1997  Hofbauer et al.
2012/0235639 A1  9/2012  Hamauzu

FOREIGN PATENT DOCUMENTS

EP    2 056 423 A2    5/2009
JP    5-308730 A      11/1993
(Continued)

OTHER PUBLICATIONS

International Search Report for PCT/JP2014/065177 dated Sep. 9, 2014.
(Continued)

*Primary Examiner* — Sun Lin
(74) *Attorney, Agent, or Firm* — Sughrue Mion, PLLC

(57) ABSTRACT

Sneaking of a charging current to a load is avoided, a voltage of a battery is not output to terminals of a connector, and the number of installed switch elements that make conductive or interrupt a feeding path is minimized. A battery pack including a battery that supplies power to a load and to which power is supplied from a charger includes: a relay connector including a first terminal, a second terminal, and a third terminal; a first feeder that connects the load to the first terminal of the relay connector; a second feeder that connects one electrode terminal of the battery to the second terminal of the relay connector; a third feeder for which one terminal is connected to the third terminal of the relay connector; and a switch element that is connected between the other terminal of the third feeder, and the other electrode terminal of the battery. The first terminal and the second terminal of the relay connector are short-circuited by a
(Continued)

jumper wire of a jumper plug, and the second terminal and the third terminal of the relay connector are respectively connected to one electrode feeder and the other electrode feeder of the charger by using a charging connector.

6 Claims, 8 Drawing Sheets

(52) U.S. Cl.
  CPC ........ *H01M 10/46* (2013.01); *H01M 2200/00* (2013.01); *H02J 2007/0039* (2013.01)

(58) Field of Classification Search
  USPC ........................................................ 320/112
  See application file for complete search history.

(56) References Cited

FOREIGN PATENT DOCUMENTS

| | | |
|---|---|---|
| JP | 7-87685 A | 3/1995 |
| JP | 10-262340 A | 9/1998 |
| JP | 2003-70168 A | 3/2003 |

OTHER PUBLICATIONS

Communication dated Aug. 29, 2016 from the European Patent Office in counterpart Application No. 14845428.3.

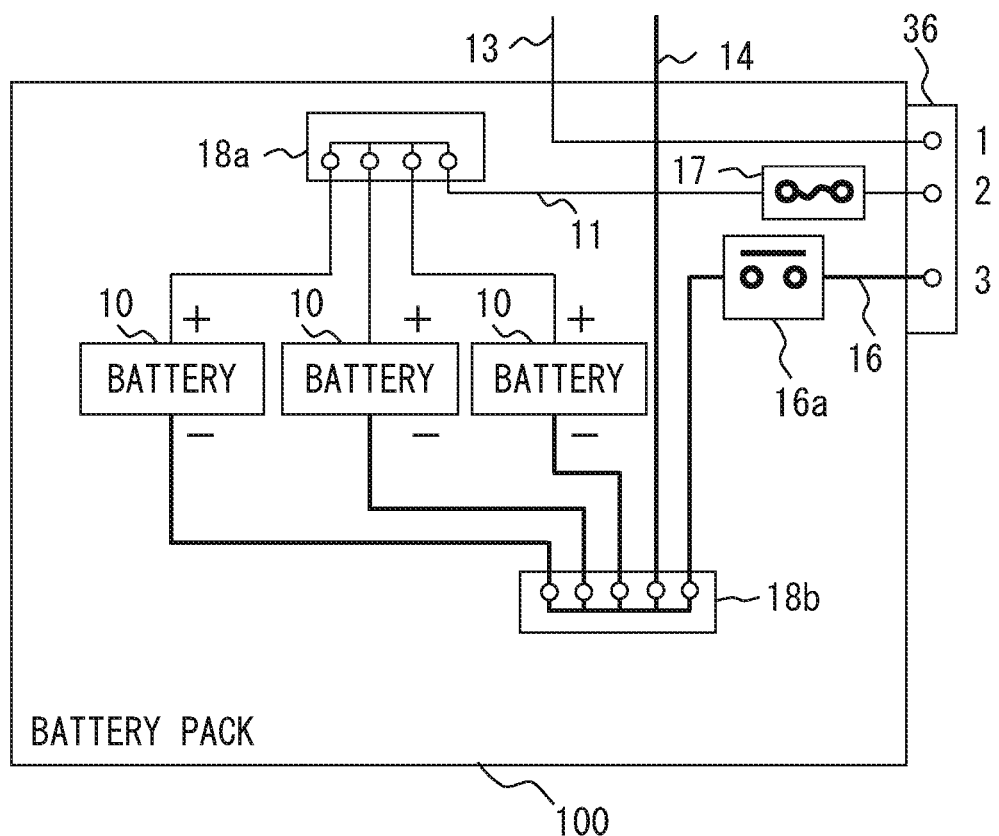
F I G. 5

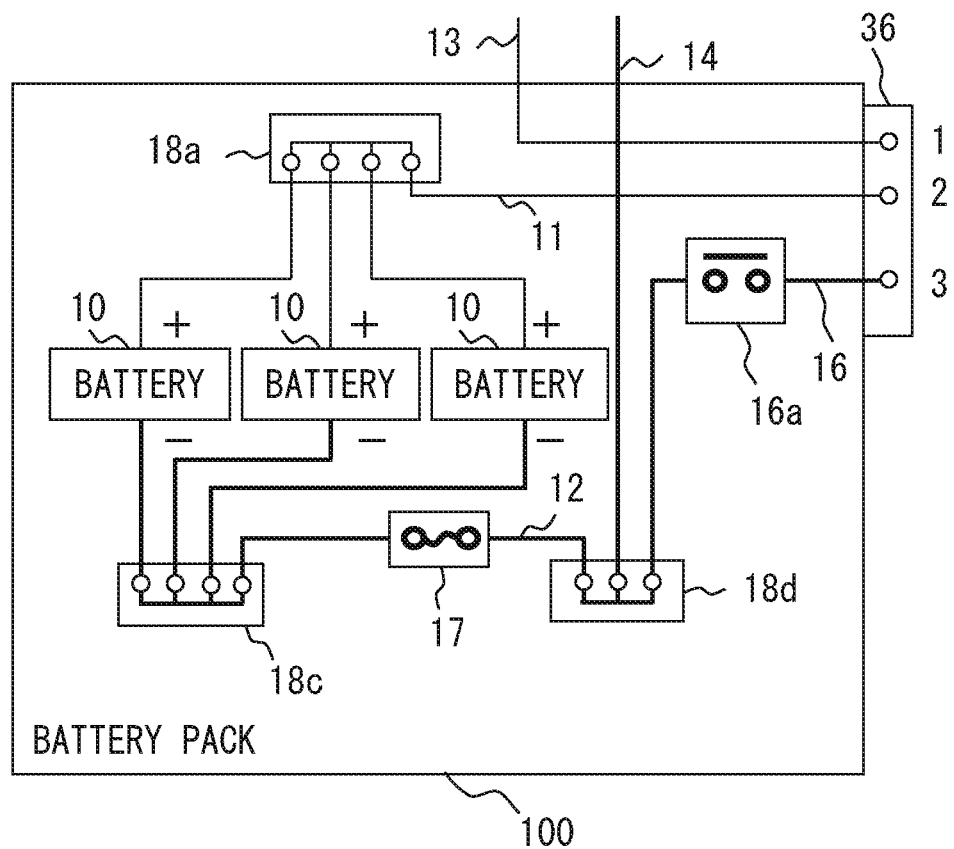
F I G. 6

RELAY CONNECTOR AND BATTERY PACK

TECHNICAL FIELD

The present invention relates to a relay connecter that is provided in a feeding path from a battery that is rechargeable to a load and a feeding path from a charger to the battery, and a battery pack including the relay connector.

RELATED ART

In a device, such as a vehicle, that is operated by a battery that is rechargeable, when a remaining capacity of the battery decreases, the battery needs to be connected to an external charger so as to be charged. In charging the battery from the charger, a feeding path from the battery to a load on the side of a machine base of the vehicle or the like is temporarily interrupted, and a feeding path from the charger to the battery is formed.

FIG. 7 illustrates a conventional exemplary configuration of respective feeding paths connected to a battery, a load, and a charger. In the exemplary configuration illustrated in FIG. 7, a battery pack 100 incorporates a battery 10 that is rechargeable. The battery 10 supplies an operation current to a load 20. A charging connector 32 is connected to a bipolar connector 31 such that a charging current is supplied from a charger 40.

A switch element 13a is interposed within a load positive-electrode feeder 13 that connects a battery positive-electrode feeder 11 connected to a positive electrode terminal of the battery 10 to the load 20, and a switch element 14a is interposed within a load negative-electrode feeder 14 that connects a battery negative-electrode feeder 12 connected to a negative electrode terminal of the battery 10 to the load 20.

In addition, a switch element 15a is interposed within a charger positive-electrode feeder 15 that connects the battery positive-electrode feeder 11 and a positive electrode terminal of the charger 40, and a switch element 16a is interposed within a charger negative-electrode feeder 16 that connects the battery negative-electrode feeder 12 and a negative electrode terminal of the charger 40.

These four switch elements 13a, 14a, 15a, and 16a respectively make conductive or interrupt the load positive-electrode feeder 13, the load negative-electrode feeder 14, the charger positive-electrode feeder 15, and the charger negative-electrode feeder 16. A mechanical switch such as a relay or a semiconductor switch such as a MOSFET (Metal-Oxide-Semiconductor Field-Effect Transistor) can be used for the switch elements 13a, 14a, 15a, and 16a.

In supplying the operation current from the battery 10 to the load 20, the switch element 13a interposed within the load positive-electrode feeder 13 and the switch element 14a interposed within the load negative-electrode feeder 14 are turned on. At this time, the switch element 15a interposed within the charger positive-electrode feeder 15 and the switch element 16a interposed within the charger negative-electrode feeder 16 are turned off.

In supplying the charging current from the charger 40 to the battery 10, the charging connector 32 is connected to the bipolar connector 31, and the switch element 15a interposed within the charger positive-electrode feeder 15 and the switch element 16a interposed within the charger negative-electrode feeder 16 are turned on. At this time, the switch element 13a interposed within the load positive-electrode feeder 13 and the switch element 14a interposed within the load negative-electrode feeder 14 are turned off.

As described above, when the operation current is supplied from the battery 10 to the load 20, the switch elements 13a and 14a are turned on, and the switch elements 15a and 16a are turned off. Consequently, a voltage of the battery 10 can be prevented from being output to terminals of the bipolar connector 31 from which the charging connector 32 has been extracted, and even when a foreign object is in contact with the terminals of the bipolar connector 31, short circuit failure of the battery 10 can be prevented from being caused by the contact.

Further, when the charging current is supplied from the charger 40 to the battery 10, the switch elements 15a and 16a are turned on, and the switch elements 13a and 14a are turned off. Consequently, a sneak current that causes the charging current from the charger 40 to flow to the load 20 via the load positive-electrode feeder 13 and the load negative-electrode feeder 14 can be avoided.

As another exemplary configuration for switching an interconnection of a battery, a load, and a charger, an exemplary configuration in which a connection between the battery and the load and a connection between the battery and the charger are switched by inserting or extracting a connector and a jumper plug is known. FIG. 8 illustrates an exemplary configuration in which connections of a battery, a load, and a charger are switched by inserting or extracting a connector and a jumper plug. This exemplary configuration is disclosed in Patent Document 1 listed below or the like.

In the exemplary configuration of FIG. 8, an overcurrent breaking element 17 that interrupts an overcurrent, a thermistor 10a that monitors a temperature of a battery 10 at the time of charging, and a thermal breaker 10b that stops charging according to information of the thermistor 10a are provided. A relay connector 33 that both a jumper plug 34 and a charging connector 35 of a charger 40 can be compatibly inserted into or extracted from is also provided.

The relay connector 33 has six electrode terminals. A battery positive-electrode feeder 11 is connected to a first terminal (in FIG. 8, the first terminal is simply indicated as "1"; the same applies hereinafter) as a positive electrode terminal via the overcurrent breaking element 17. The charger negative-electrode feeder 16 is connected to a second terminal. The load positive-electrode feeder 13 to a load 20 is connected to a third terminal.

One terminal of the thermal breaker 10b is connected to a fourth terminal of the relay connector 33, one terminal of the thermistor 10a is connected to a fifth terminal, and the other terminal of the thermal breaker 10b and the other terminal of the thermistor 10a are connected to a sixth terminal.

The jumper plug 34 includes a pair of a first pin and a third pin (in FIG. 8, the first pin and the third pin are simply indicated as "1" and "3", respectively) that are electrically short-circuited by a jumper wire 34a. By inserting the jumper plug 34 into the relay connector 33, the first terminal and the third terminal of the relay connector 33 are short-circuited.

In supplying an operation current from the battery 10 to the load 20, the jumper plug 34 is inserted into the relay connector 33 such that the operation current is supplied to the load 20 via a path of the battery 10→the battery positive-electrode feeder 11→the overcurrent breaking element 17→the first terminal of the relay connector 33→the first pin of the jumper plug 34→the jumper wire 34a→the third pin of the jumper plug 34→the third terminal of the relay connector 33→the load positive-electrode feeder 13→the load 20→the load negative-electrode feeder 14→the battery negative-electrode feeder 12→the battery 10.

The charger 40 includes the charging connector 35 connected to the relay connector 33, and a power plug 41 connected to a commercial power supply. The charging connector 35 includes a first pin (in FIG. 8, the first pin is simply indicated as "1"; the same applies hereinafter), a second pin, a fourth pin, a fifth pin, and a sixth pin that are respectively connected to the first terminal, the second terminal, the fourth terminal, the fifth terminal, and the sixth terminal of the relay connector 33. The charging connector 35 is a connector that is inserted into the relay connector 33 when the battery 10 is charged by the charger 40.

In supplying a charging current from the charger 40 to the battery 10, the charging connector 35 is inserted into the relay connector 33 such that the charging current is supplied to the battery 10 via a path of the charger 40→the first pin of the charging connector 35→the first terminal of the relay connector 33→the overcurrent breaking element 17→the battery positive-electrode feeder 11→the battery 10→the battery negative-electrode feeder 12→the charger negative-electrode feeder 16→the second terminal of the relay connector 33→the second pin of the charging connector 35→the charger 40.

As described above, the relay connector 33 is interposed within feeding of the operation current and feeding of the charging current, and the jumper plug 34 and the charging connector 35 that are inserted into the relay connector 33 are prepared. When the operation current is supplied to the load 20, the jumper plug 34 is inserted into the relay connector 33 such that the battery 10 and the load 20 are connected. During the non-operation of the load 20, the jumper plug 34 is extracted from the relay connector 33 such that the load positive-electrode feeder 13 is completely cut from the battery 10.

When the battery 10 is charged, the charging connector 35 is inserted into the relay connector 33 such that the charging current is supplied to the battery 10 via the first pin and the second pin of the charging connector 35 and the first terminal and the second terminal of the relay connector 33. Because the load positive-electrode feeder 13 is disconnected during charging, the charging current from the charger 40 does not flow to the load 20 via the load positive-electrode feeder 13, and the charging current is prevented from sneaking into the load 20.

In this exemplary configuration, the first terminal of the relay connector 33 connected to the battery positive-electrode feeder 11 is used to supply power from the charger 40 to the battery 10 and to supply power to the load 20 through the load positive-electrode feeder 13 via the jumper plug 34. As a result, the number of terminals of the relay connector 33 can decrease, and a cost can also decrease.

CITATION LIST

Patent Documents

Patent Document 1: Japanese Laid-Open Patent Publication No. 2003-70168

SUMMARY OF INVENTION

Technical Problem

In the exemplary connection configuration illustrated in FIG. 7 of a battery, a load, and a charger, four switch elements 13a, 14a, 15a, and 16a that make conductive or interrupt a feeding path are provided, and therefore, a cost for the four switch elements is added. During the operation of the load 20, a current that maintains the switch elements 13a and 14a interposed within the load positive-electrode feeder 13 and the load negative-electrode feeder 14 in an ON state needs to continue to flow, and this results in an increase in current consumption of the battery 10.

In the exemplary configuration illustrated in FIG. 8 in which a connector and a jumper plug are inserted or extracted, when both the jumper plug 34 and the charging connector 35 are extracted from the relay connector 33, a voltage of the battery 10 is output to the first terminal and the second terminal of the relay connector 33. When a foreign object comes into contact with the first terminal and the second terminal of the relay connector 33, the contact causes short circuit failure of the battery 10.

In view of the problems above, the present invention provides a relay connector and a battery pack in which, in a connection configuration of a battery, a load, and a charger, a sneak current that causes a charging current from the charger to flow to the load is not generated, a voltage of the battery is not output to terminals of a connector, and the number of installed switch elements that make conductive or interrupt a feeding path can be minimized.

Means for Solving the Problems

A relay connector according to the present invention includes first, second, and third terminals. The first terminal is connected to a feeder that supplies power to a load, the second terminal is connected to one electrode terminal of a battery, the third terminal is connected to one terminal of a switch element for which the other terminal is connected to the other electrode terminal of the battery and the load, the first terminal and the second terminal are short-circuited by a jumper wire of a jumper plug, and the second terminal and the third terminal are respectively connected to one electrode feeder and the other electrode feeder of a charger by using a charging connector.

The second terminal may be connected to the one electrode terminal of the battery via an overcurrent breaking element.

The overcurrent breaking element may be interposed within a middle of a feeder through which a feeding current to the load flows, the feeder being a portion of a feeder connecting the other electrode terminal of the battery and the switch element.

A battery pack according to the present invention is a battery pack including a battery that supplies power to a load and to which power is supplied from a charger. The battery pack according to the present invention includes: a relay connector including first, second, and third terminals; a first feeder that connects the load to the first terminal of the relay connector; a second feeder that connects one electrode terminal of the battery to the second terminal of the relay connector; a third feeder for which one terminal is connected to the third terminal of the relay connector; and a switch element that is connected between the other terminal of the third feeder, and the other electrode terminal of the battery and the load. The first terminal and the second terminal of the relay connector are short-circuited by a jumper wire of a jumper plug, and the second terminal and the third terminal of the relay connector are respectively connected to one electrode feeder and the other electrode feeder of the charger by using a charging connector.

The overcurrent breaking element may be provided between the one electrode terminal of the battery and the second terminal of the relay connector in the second feeder.

The overcurrent breaking element may be interposed within a middle of a fourth feeder through which a feeding current to the load flows, the fourth feeder being a portion of a feeder connecting the other electrode terminal of the battery and the switch element.

Advantageous Effects of Invention

According to the present invention, in a connection configuration of a battery, a load, and a charger, the battery and the load or the battery and the charger are connected using a relay connector by inserting or extracting a jumper plug or a charging connector into or from the relay connector, and a switch element is arranged in a feeder that is connected only to the charger. Consequently, a sneak current that causes a charging current from the charger to flow to the load is not generated, and a voltage of the battery is not output to terminals of a connector, the number of installed switch elements that make conductive or interrupt a feeding path can be minimized, and current consumption during the operation can be minimized.

Further, an overcurrent breaking element is provided in a feeding path through which both a charging current and an operation current flow, and consequently, elements including a battery, parts, or the like can be protected from either overcurrent, of the operation current or the charging current, by using one overcurrent breaking element.

BRIEF DESCRIPTION OF DRAWINGS

FIG. 5 illustrates an exemplary connection configuration of an overcurrent breaking element using a terminal block in the first exemplary configuration.

FIG. 6 illustrates an exemplary connection configuration of an overcurrent breaking element using a terminal block in the second exemplary configuration.

DESCRIPTION OF EMBODIMENTS

Figure 1:
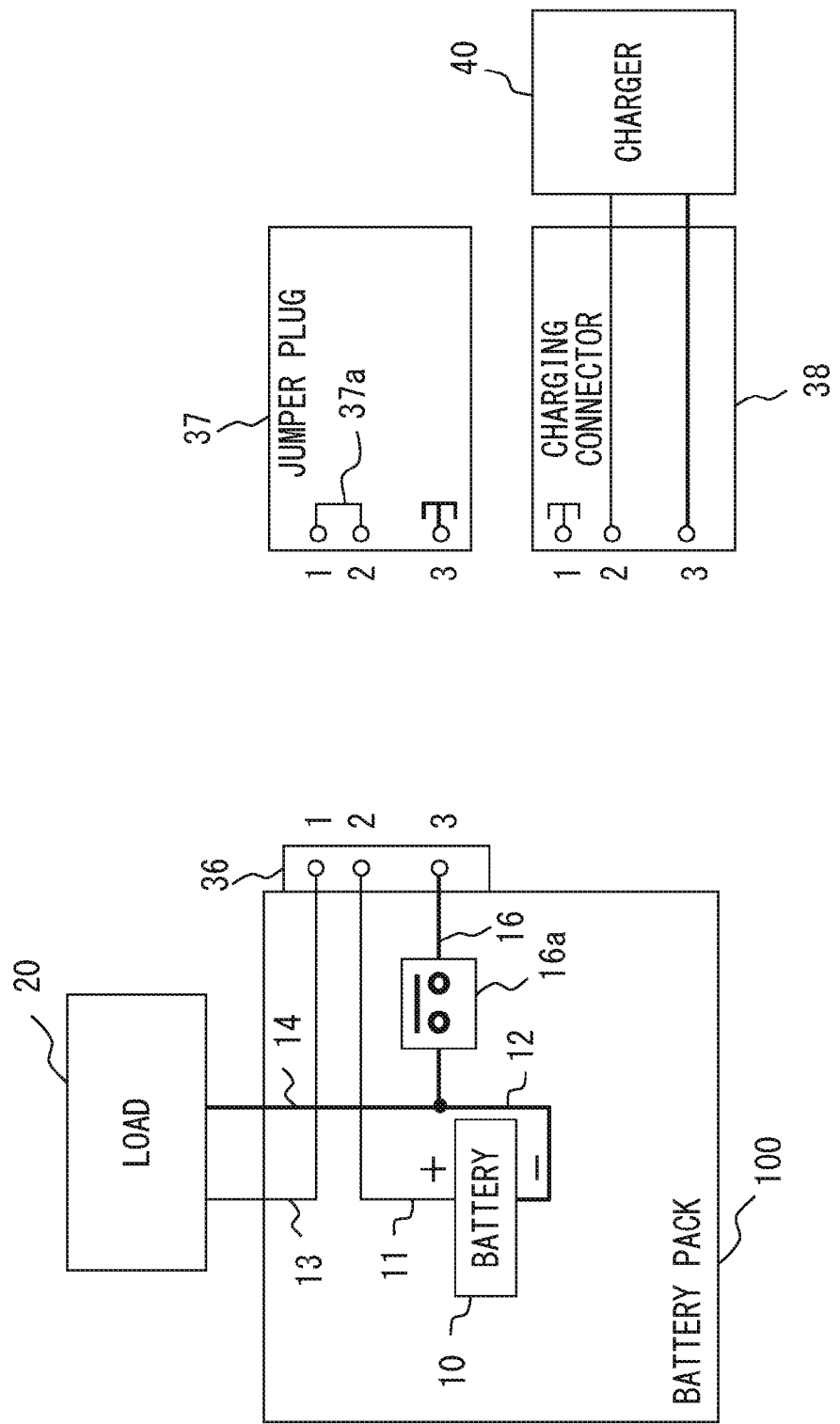
FIG. 1 illustrates an exemplary connection configuration of a battery, a load, and a charger, using a relay connector.

Embodiments of the present invention are described with reference to the drawings. FIG. 1 illustrates an exemplary connection configuration of a battery, a load, and a charger, using a relay connector of the present invention. In the exemplary connection configuration of FIG. 1, a battery pack 100 incorporates a battery 10 that is rechargeable. When a jumper plug 37 is connected to a relay connector 36, the battery 10 supplies an operation current to a load 20, and when a charging connector 38 is connected to the relay connector 36, a charging current is supplied from a charger 40.

A first terminal (in FIG. 1, the first terminal is simply indicated as "1"; the same applies hereinafter) of the relay connector 36 is connected to a load positive-electrode feeder 13 of the load 20, a second terminal is connected to a battery positive-electrode feeder 11 of the battery 10, and a third terminal is connected to one terminal of a charger negative-electrode feeder 16 that is connected only to the charger 40.

The other terminal of the charger negative-electrode feeder 16 is connected to one terminal of a switch element 16a, and the other terminal of the switch element 16a is connected to a negative electrode terminal of the battery 10. Alternatively, the other terminal of the switch element 16a is connected to a battery negative-electrode feeder 12 that is connected to the negative electrode terminal of the battery 10.

In the description of the embodiments, like the load positive-electrode feeder 13, the battery positive-electrode feeder 11, the charger negative-electrode feeder 16, the battery negative-electrode feeder 12, and the like, the terms "positive electrode" and "negative electrode" are added to respective feeders according to the exemplary configuration of FIG. 1 in order to simply distinguish and describe the respective feeders. However, a configuration having the same function and action can even be implemented by employing a circuit configuration having a polarity opposite to the polarity of the exemplary configuration of FIG. 1, and the feeders according to the present invention are not limited by the terms "positive electrode" and "negative electrode".

Note that the first feeder described in the above Means for Solving the Problems corresponds to the load positive-electrode feeder 13, the second feeder corresponds to the battery positive-electrode feeder 11, the third feeder corresponds to the charger negative-electrode feeder 16, and the fourth feeder corresponds to the battery negative-electrode feeder 12. The one electrode terminal of the battery described in the above Means for Solving the Problems corresponds to the positive electrode terminal of the battery 10, and the other electrode terminal of the battery corresponds to the negative electrode terminal of the battery 10.

Accordingly, a first terminal of the relay connector 36 is connected to the feeder 13 that supplies power to the load 20, a second terminal is connected to one electrode terminal of the battery 10, and a third terminal is connected to one terminal of the switch element 16a for which the other terminal is connected to the other electrode terminal of the battery 10 and the load 20.

In the embodiments, the relay connecter 36 having the first, second, and third terminals has been described. However, in the present invention, a connector having at least three terminals, first, second, and third terminals, may be provided, and a relay connector having only three terminals does not always need to be provided. It goes without saying that a function and action similar to those of the present invention can be achieved by using a four-or-more-electrode connector having four or more terminals and applying a connection form similar to that of the embodiments to three terminals of the four or more terminals.

A jumper wire 37a is provided in the jumper plug 37, and the jumper wire 37a electrically short-circuits a first pin (in FIG. 1, the first pin is simply indicated as "1"; the same applies hereinafter) that is connected to the first terminal of the relay connecter 36 and a second pin connected to the second terminal of the relay connecter 36. The jumper plug 37 shields, in a connectionless state, a third pin connected to the third terminal of the relay connecter 36.

In the battery pack 100, the load negative-electrode feeder 14 connected to the load 20 is always connected to the negative terminal of the battery 10, or to the battery negative-electrode feeder 12 of the battery 10. When an operation current is supplied from the battery 10 to the load 20, the jumper plug 37 is inserted into the relay connecter 36 such that the battery positive-electrode feeder 11 is connected to the load positive-electrode feeder 13 of the load 20 via the jumper wire 37a in the jumper plug 37, and the operation current can be supplied to the load 20.

Namely, the operation current is supplied from the battery 10 to the load 20 via a path of the battery 10→the battery positive-electrode feeder 11→the second terminal of the relay connecter 36→the second pin of the jumper plug 37→the jumper wire 37a→the first pin of the jumper plug 37→the first terminal of the relay connecter 36→the load positive-electrode feeder 13→the load 20→the load negative-electrode feeder 14→the battery negative-electrode feeder 12→the battery 10.

The charging connector 38 used to charge the battery 10 from the charger 40 shields, in a connectionless state, a first pin (in FIG. 1, the first pin is simply indicated as "1"; the same applies hereinafter) that is connected to the first terminal of the relay connecter 36, the charging connector 38 connects a second pin connected to the second terminal of the relay connecter 36 to a positive electrode feeder of the charger 40, and the charging connector 38 connects a third pin connected to the third terminal of the relay connecter 36 to a negative electrode feeder of the charger 40.

When a charging current is supplied from the charger 40 to the battery 10, the charging connector 38 is inserted into the relay connecter 36 and the switch element 16a is turned on such that the charging current is supplied from the charger 40 to the battery 10 via the second and third pins of the charging connector 38, the second and third terminals of the relay connecter 36, and the switch element 16a.

Namely, the charging current is supplied from the charger 40 to the battery 10 via a path of the positive electrode feeder of the charger 40→the second pin of the charging connector 38→the second terminal of the relay connecter 36→the battery positive-electrode feeder 11→the battery 10→the battery negative-electrode feeder 12→the switch element 16a→the charger negative-electrode feeder 16→the third terminal of the relay connecter 36→the third pin of the charging connector 38→the negative electrode feeder of the charger 40.

As described above, during the operation of the load 20, the jumper plug 37 is inserted into the relay connecter 36, and the switch element 16a is turned off. Consequently, the operation current can be supplied from the battery 10 to the load 20 without continuing to apply a current to the switch element 16a during the operation of the load 20.

Further, when the battery 10 is charged, the jumper plug 37 is extracted from the relay connecter 36, the charging connector 38 is inserted into the relay connecter 36, and the switch element 16a is turned on. Consequently, a charging current from the charger 40 is supplied only to the battery 10, and the load positive-electrode feeder 13 of the load 20 is cut from the battery positive-electrode feeder 11. Accordingly, a sneak current to the load 20 is not generated.

Furthermore, when the jumper plug 37 and the charging connector 38 are extracted from the relay connecter 36, the switch element 16a is turned off. As a result, a voltage of the battery 10 can be prevented from being output to terminals of the relay connecter 36, and a short circuit failure of the battery 10 can be prevented from being caused by a contact of a foreign object with the terminals of the relay connecter 36.

The switch element 16a that prevents the voltage of the battery 10 from being output to the terminals of the relay connecter 36 does not always need to have a configuration in which the switch element 16a is provided so as to be interposed within the charger negative-electrode feeder 16 connected only to the charger 40, as illustrated in FIG. 1, and the switch element 16a can have a configuration (1) in which the switch element 16a is provided so as to be interposed within the battery negative-electrode feeder 12 of the battery 10 that is a feeding path of both the operation current to the load 20 and the charging current from the charger 40, or a configuration (2) in which the switch element 16a is provided so as to be interposed within the battery positive-electrode feeder 11 that is a feeding path of both the operation current to the load 20 and the charging current from the charger 40.

However, in both of the configurations (1) and (2), a holding current that maintains a switch element that is interposed within the battery negative-electrode feeder 12, the battery positive-electrode feeder 11, or the load positive-electrode feeder 13 in an ON state during the operation of the load 20 needs to continue to flow, and this results in an increase in current consumption of the battery 10.

On the other hand, in the configuration in which the switch element 16a is provided in the middle of the charger negative-electrode feeder 16 connected only to the charger 40, as illustrated in FIG. 1, the switch element 16a can be in an ON state only during the charging, and the switch element 16a can be in an OFF state during the operation. This allows current consumption during the operation to decrease, compared with the configurations (1) and (2) described above.

Figure 2:
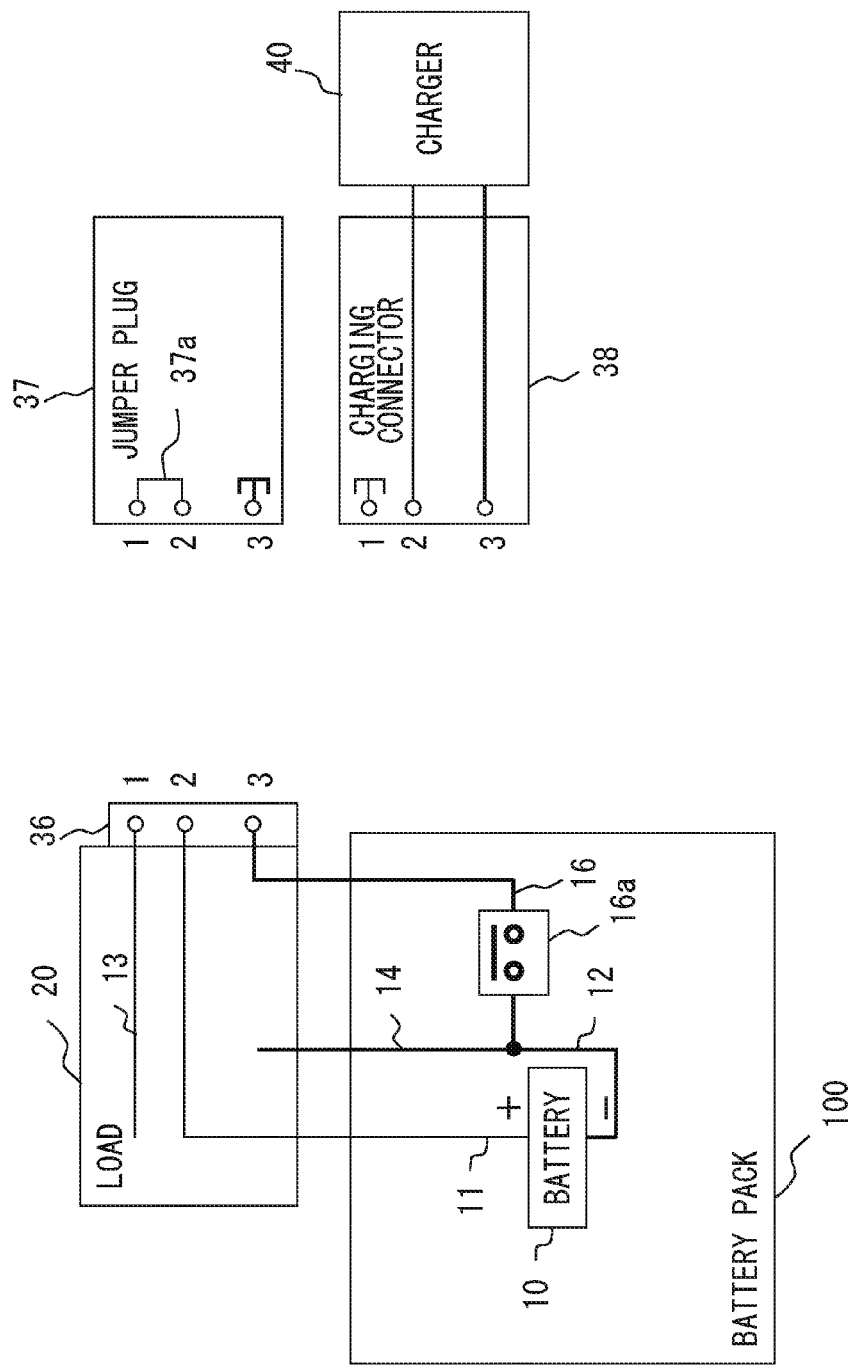
FIG. 2 illustrates an exemplary configuration in which a relay connector is arranged in a machine base or the like on a load side.

FIG. 1 illustrates an exemplary configuration in which the relay connecter 36 is arranged in the battery pack 100; however, the relay connecter 36 may be configured so as to be arranged in a machine base or the like on the side of the load 20. FIG. 2 illustrates an exemplary configuration in which the relay connecter 36 is arranged in a machine base or the like on the side of the load 20. A connection configuration illustrated in FIG. 2 of the relay connecter 36, the battery 10, the load 20, and the switch element 16a is the same as the connection configuration illustrated in FIG. 1, and therefore an overlapping description is omitted.

Figure 3:
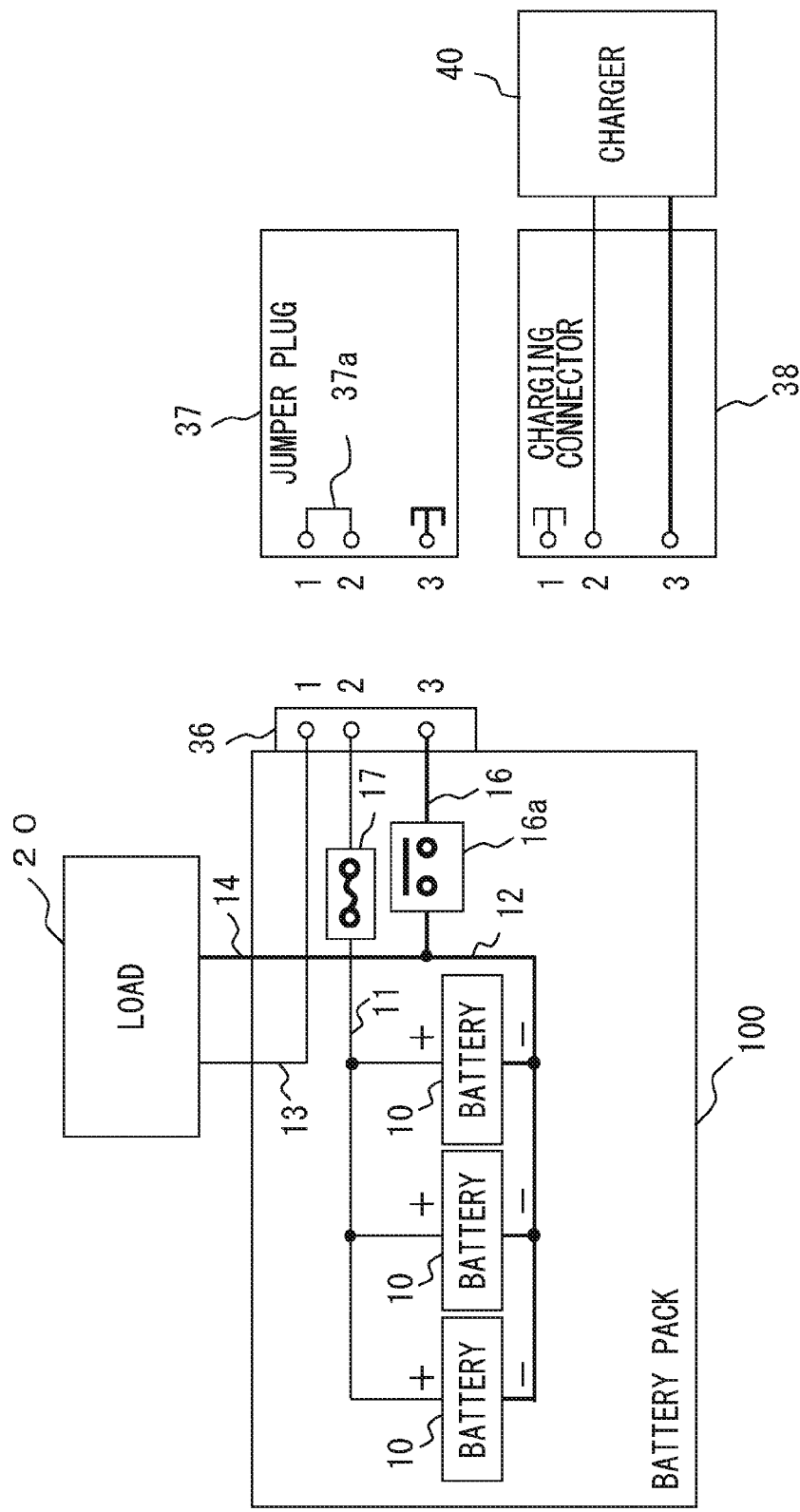
FIG. 3 illustrates a first exemplary configuration in which an overcurrent breaking element is further provided.

FIG. 3 illustrates a first exemplary configuration in which an overcurrent breaking element 17 such as a fuse is further provided. The first exemplary configuration illustrated in FIG. 3 represents an exemplary configuration in which the overcurrent breaking element 17 is interposed within a middle of a battery positive-electrode feeder 11. The battery positive-electrode feeder 11 is a feeding path of an operation current from a battery 10 to a load 20 and a feeding path of a charging current from a charger 40 to the battery 10. Therefore, by arranging the overcurrent breaking element 17 in the battery positive-electrode feeder 11, elements including the battery 10, parts, or the like can be protected from either overcurrent, of the operation current or the charging current, by using one overcurrent breaking element 17.

Figure 4:
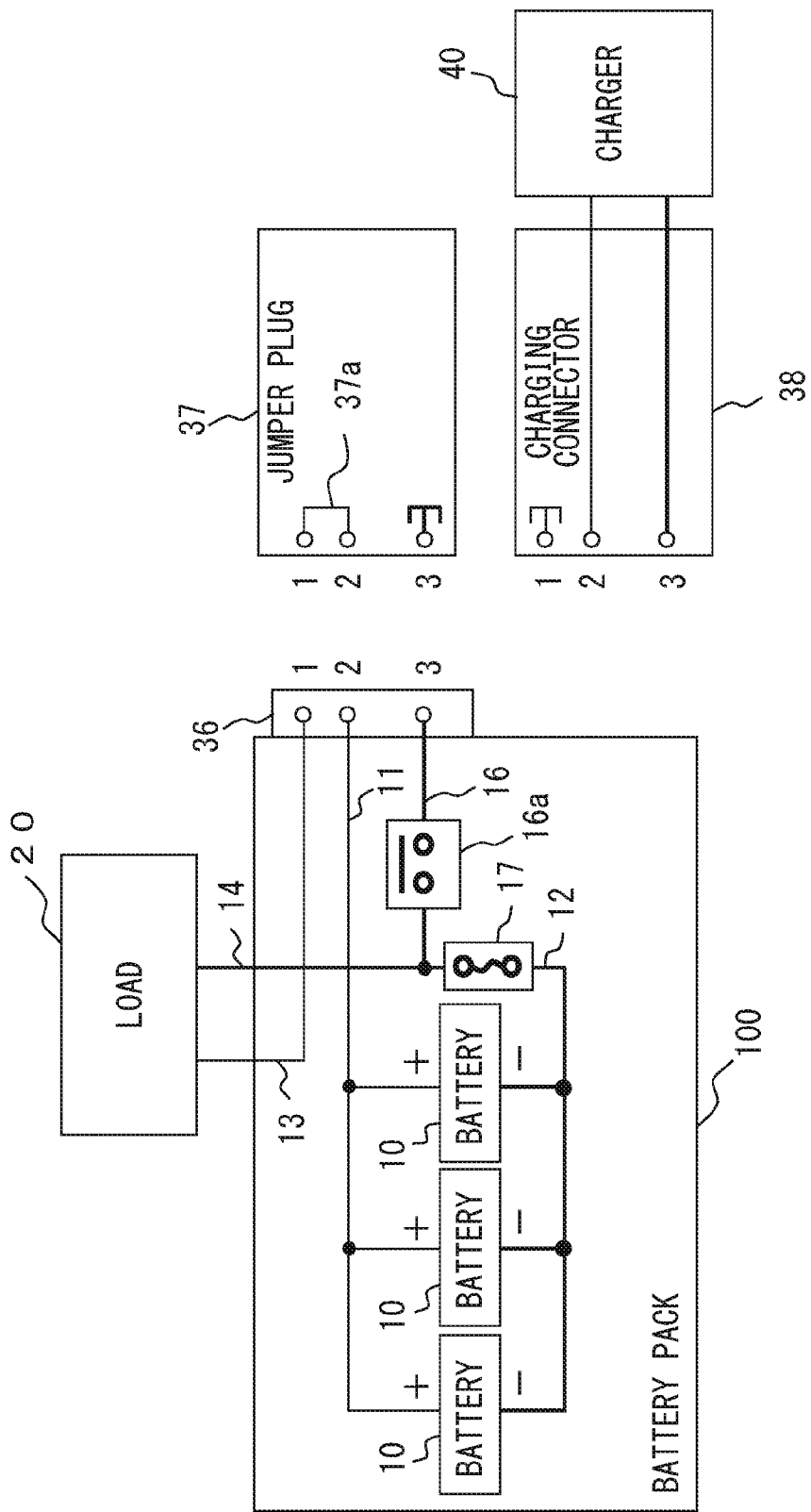
FIG. 4 illustrates a second exemplary configuration in which an overcurrent breaking element is further provided.
Figure 7:
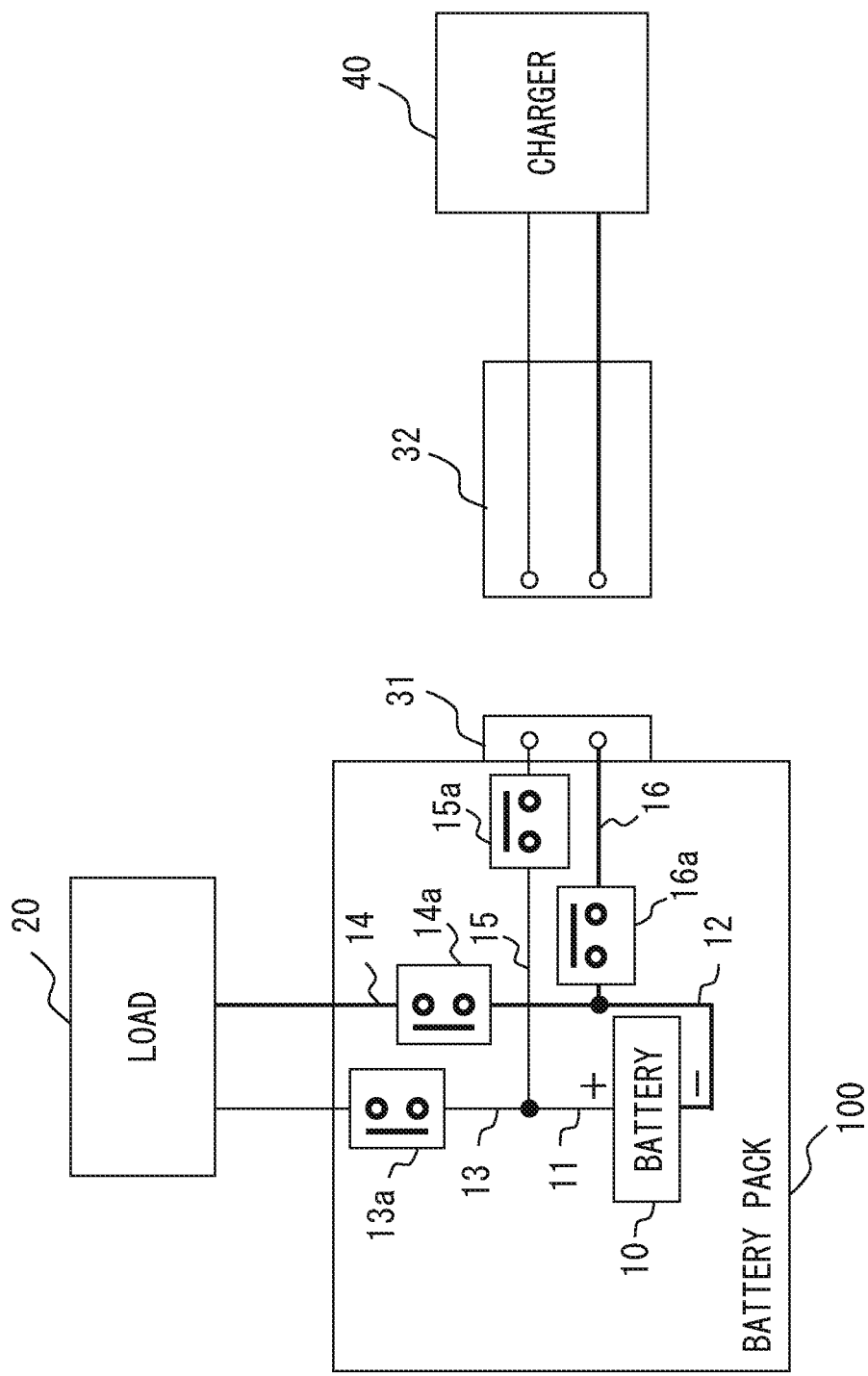
FIG. 7 illustrates a conventional exemplary configuration of respective feeding paths connected to a battery, a load, and a charger.
Figure 8:
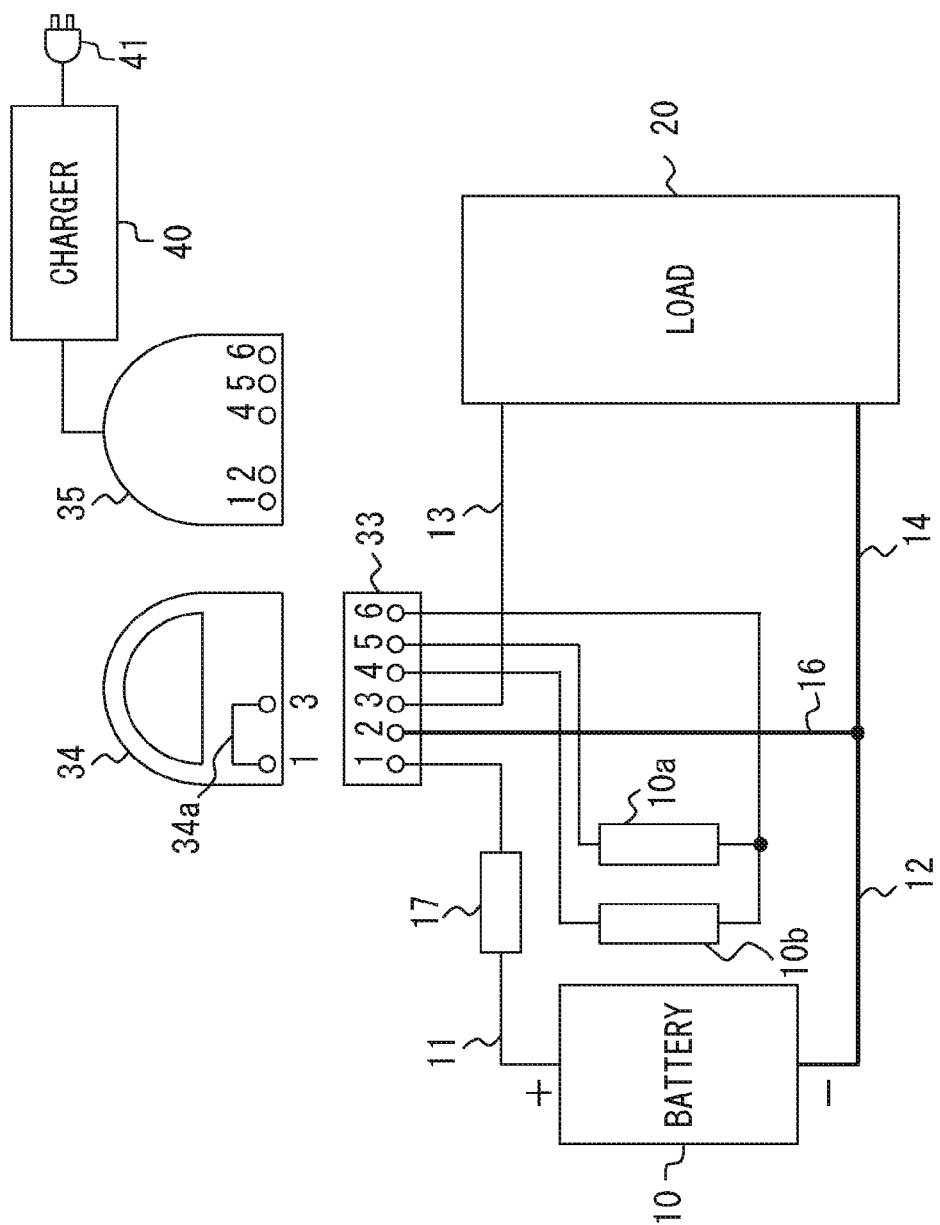
FIG. 8 illustrates a conventional exemplary configuration in which connections of a battery, a load, and a charger are switched.

FIG. 4 illustrates a second exemplary configuration in which an overcurrent breaking element 17 such as a fuse is further provided. The second exemplary configuration illustrated in FIG. 4 represents an exemplary configuration in which the overcurrent breaking element 17 is interposed within a middle of a battery negative-electrode feeder 12 of the battery 10. The battery negative-electrode feeder 12 of the battery 10 is a portion of a feeding path of an operation current from the battery 10 to a load 20 and a portion of a feeding path of a charging current from a charger 40 to the battery 10. Accordingly, by arranging the overcurrent breaking element 17 in the battery negative-electrode feeder 12, elements including the battery 10, parts, or the like can be protected from either overcurrent, of the operation current or the charging current, by using one overcurrent breaking element 17.

FIG. 5 illustrates an exemplary connection configuration of an overcurrent breaking element 17 using a terminal block in the first exemplary configuration illustrated in FIG. 3, and FIG. 6 illustrates an exemplary connection configuration of an overcurrent breaking element 17 using a terminal block in the second exemplary configuration illustrated in FIG. 4.

As an example, when three batteries 10 are connected in parallel, in the first exemplary configuration, a terminal block for four terminals 18a can be used to connect positive electrode terminals of the three batteries 10 to one battery positive-electrode feeder 11, and a terminal block for five terminals 18b can be used to connect negative electrode terminals of the three batteries 10 to a load negative-electrode feeder 14 and a charger negative-electrode feeder 16, as illustrated in FIG. 5. In the terminal block for four terminals 18a and the terminal block for five terminals 18b, respective terminals are connected via a common connection wire.

The positive electrode terminals of the three batteries 10 are connected to three terminals of the terminal block for four terminals 18a, and the overcurrent breaking element 17 is connected between the other one terminal of the terminal block for four terminals 18a and a second terminal of a relay connector. The negative electrode terminals of the three batteries 10 are connected to three terminals of the terminal block for five terminals 18b, and the load negative-electrode feeder 14 and the charger negative-electrode feeder 16 are connected to the other two terminals of the terminal block for five terminals 18b. As illustrated in FIG. 5, in the first exemplary configuration, the overcurrent breaking element 17 can be connected by using one terminal block for four terminals 18a and one terminal block for five terminals 18b.

On the other hand, in the second exemplary configuration, a terminal block for four terminals 18a used to connect positive electrode terminals of three batteries 10 to a battery positive-electrode feeder 11, a terminal block for four terminals 18c used to connect negative electrode terminals of the three batteries 10 to one terminal of the overcurrent breaking element 17, and a terminal block for three terminals 18d used to connect the other terminal of the overcurrent breaking element 17 to a load negative-electrode feeder 14 and a charger negative-electrode feeder 16 are prepared, as illustrated in FIG. 6.

As illustrated in FIG. 6, in the second exemplary configuration, three terminal blocks, two terminal blocks for four terminals 18a and 18c and one terminal block for three terminals 18d, need to be used to connect the overcurrent breaking element 17. Therefore, one more terminal block needs to be provided, compared with the first exemplary configuration.

In addition, the battery 10 and the load 20 are often configured so as to have a common ground potential by connecting a feeder on a negative electrode side of the battery 10 to a grounding wire of the load 20. In this case, in an exemplary configuration in which the overcurrent breaking element 17 is provided in the battery negative-electrode feeder 12, as in the second exemplary configuration, when the battery negative-electrode feeder 12 is interrupted by the overcurrent breaking element 17, the feeder on the negative electrode side of the battery 10 is cut from the grounding wire or the like of the load 20, and the battery 10 and the load 20 do not have a common ground potential. Therefore, in the configuration above, the first exemplary configuration is preferable to the second exemplary configuration.

The embodiments of the present invention have been described above. However, the present invention is not limited to the embodiments described above, and various configurations or embodiments can be implemented without departing from the gist of the present invention.

REFERENCE SIGNS LIST

10 Battery
11 Battery positive-electrode feeder
12 Battery negative-electrode feeder
13 Load positive-electrode feeder
14 Load negative-electrode feeder
16 Charger negative-electrode feeder
16a Switch element
100 Battery pack
20 Load
36 Relay connector
37 Jumper plug
37a Jumper wire
38 Charging connector
40 Charger

The invention claimed is:

1. A relay connector including a first terminal, a second terminal, and a third terminal, wherein
the first terminal is connected to a feeder that supplies power to a load,
the second terminal is connected to one electrode terminal of a battery,
the third terminal is connected to one terminal of a switch element from which another terminal of the switch element is connected to another electrode terminal of the battery and the load, and
the first terminal and the second terminal are short-circuited by a jumper wire of a jumper plug, and the second terminal and the third terminal are respectively connected to one electrode feeder and another electrode feeder of a charger by using a charging connector.

2. The relay connector according to claim 1, wherein the second terminal is connected to the one electrode terminal of the battery via an overcurrent breaking element.

3. The relay connector according to claim 1, wherein an overcurrent breaking element is interposed within a middle of a feeder through which a feeding current to the load flows, the feeder being a portion of a feeder connecting the other electrode terminal of the battery and the switch element.

4. A battery pack including a battery that supplies power to a load and to which power is supplied from a charger, the battery pack comprising:
a relay connector including a first terminal, a second terminal, and a third terminal;
a first feeder that connects the load to the first terminal of the relay connector;
a second feeder that connects one electrode terminal of the battery to the second terminal of the relay connector;
a third feeder for which one terminal is connected to the third terminal of the relay connector; and a switch element that is connected between another terminal of the third feeder, and another electrode terminal of the battery and the load, wherein the first terminal and the second terminal of the relay connector are short-circuited by a jumper wire of a jumper plug, and the second terminal and the third terminal of the relay connector are respectively connected to one electrode feeder and another electrode feeder of the charger by using a charging connector.

5. The battery pack according to claim 4, further comprising:

an overcurrent breaking element that is provided between the one electrode terminal of the battery and the second terminal of the relay connector in the second feeder.

6. The battery pack according to claim 4, the battery pack further comprising:

an overcurrent breaking element that is interposed within a middle of a fourth feeder through which a feeding current to the load flows, the fourth feeder being a portion of a feeder connecting the other electrode terminal of the battery and the switch element.

* * * * *